US006209470B1

(12) United States Patent
Burg

(10) Patent No.: US 6,209,470 B1
(45) Date of Patent: *Apr. 3, 2001

(54) STABLE SEMI-SUBMERSIBLE SURFACE EFFECT SHIP

(76) Inventor: Donald E. Burg, 15840 SW. 84 Ave., Miami, FL (US) 33157

( * ) Notice: Subject to any disclaimer, the term of this patent is extended or adjusted under 35 U.S.C. 154(b) by 0 days.

This patent is subject to a terminal disclaimer.

(21) Appl. No.: 09/225,096

(22) Filed: Jan. 4, 1999

Related U.S. Application Data

(63) Continuation-in-part of application No. 08/818,311, filed on Mar. 14, 1997, now Pat. No. 5,860,380.

(51) Int. Cl.$^7$ ........................................................ B63B 1/38
(52) U.S. Cl. ...................... 114/61.12; 114/67 A; 114/283
(58) Field of Search .................................... 114/289, 290, 114/67 A, 283, 61.12, 274

(56) References Cited

U.S. PATENT DOCUMENTS

| | | | |
|---|---|---|---|
| 1,307,135 | * 6/1919 | Lake | 114/67 A |
| 3,279,407 | * 10/1966 | Stenger | 114/280 |
| 4,802,428 | * 2/1989 | Lang | 114/283 |
| 5,176,095 | * 1/1993 | Burg | 114/67 A |
| 5,860,380 | * 1/1999 | Burg | 114/67 A |

* cited by examiner

Primary Examiner—Sherman Basinger
(74) Attorney, Agent, or Firm—Robert J. Van Der Wall

(57) ABSTRACT

An improved multi-operational mode marine vessel is proposed that has blower pressurized air cushions that are utilized during high speed operations disposed in one or more secondary supporting hulls wherein said secondary supporting hulls are connected to a main hull by struts in the preferred embodiment of the invention and where, when the air cushions are not utilized, the secondary hulls are at least partially submerged thereby providing an exceptionally stable marine vehicle while stationary or at low speeds. This submergence of the secondary hulls can be enhanced by use of one or more water buoyancy tanks that would generally be disposed in the secondary supporting hulls. In the preferred version of the invention, blower pressurized air is ducted from blowers in the main hull through the struts to the air cushion recesses in the secondary supporting hulls. When more than one secondary supporting hull is used, it is preferable that a duct(s) connects separate air cushion recesses in separate secondary supporting hulls by way of the struts and/or a hollow hydrofoil that connects gas cushions in the secondary supporting hulls. The optional hydrofoil can improve stability and also add to vessel weight carrying capabilities. The gas cushion recesses are defined as being generally boat shaped with more narrow bows than sterns and as having aft seals.

20 Claims, 3 Drawing Sheets

STABLE SEMI-SUBMERSIBLE SURFACE EFFECT SHIP

RELATED UNITED STATES APPLICATION DATA

This application is a continuation-in-part to United States application Ser. No. 08/818,311 filed Mar. 14, 1997 now U.S. Pat. No. 5,860,380.

FIELD OF THE INVENTION

This invention relates to the field of marine vehicles that are at least partially supported by one or more artificially pressurized air cushions. The air cushion provides a supporting layer of air between the marine vehicle and the water thereby reducing wetted area friction and hence making for a more efficient marine vehicle. This greater efficiency is particularly evident at high speed.

BACKGROUND OF THE INVENTION

There have been numerous Air Cushion Vehicle (ACV) designs with the majority using either fill or partial periphery flexible fabric air seals. The full periphery flexible seal craft are normally known as Ground Effect Machines (GEMs) and are amphibious. The second common type generally use fixed structure catamaran side keels with flexible seals fore and aft to thereby define a single rectangular air cushion that supports a craft limited to the marine environment. These latter craft are generally referred to as Air Cushion Vehicles (ACV's) or Surface Effect Ships (SESs). The term SES is most descriptive since these vehicles run mostly in surface effect over a water surface no matter the exact design.

Some simple and yet vastly improved SES variations have been proposed by the Inventor such as can be seen in Burg, U.S. Pat. No. 5,176,095 and 5,415,120. All of these utilize multi-hull designs that have a simple hull structure recess built into one or more of the multi-hulls. There are no air cushions between the multiple hulls and there are no flexible seals. Quite simply, these inventions avoid the problems associated with flexible seal SESs including high flexible seal initial and maintenance costs, a rough bumpy ride related to the flexible bow seal of the generic flexible seal SES allowing waves to disturb the large air cushion that is in reality a large gas spring, and poor ride qualities in rough seas that is largely due to the wide barn door shape of the SES's flexible bow seal.

The instant invention presents improvements to the ideas presented in Inventor's previously listed patents in that it provides an exceptionally smooth ride in rough seas when at rest or traveling at low speeds. This is done without sacrificing the high speed efficiency of the Inventor's previous inventions. The ability to have a very efficient high speed vessel combined with exceptional stability when at rest or low speeds offers unique advantage. Some applications for this new technology include military craft, offshore oil field support vessels, fishing vessels, offshore gaming vessels, and other craft. It is primarily applicable to any marine craft that must be able to get to a station location quickly at high speed and then stay on station for long periods with a minimum of passenger and crew discomfort.

A very stable relatively low speed vessel has been available for a number of years in the form of the Small Waterplane Twin Hull (SWATH). The SWATH concept generally uses twin submerged torpedo or submarine shaped hulls disposed in catamaran configuration below a main hull that is above the waterline. Each submerged torpedo hull is connected to the main hull by one or more struts. While very stable, SWATH has a high drag coefficient at higher speeds. For example, a 100 foot SWATH would generally be considered to require very high propulsive power at over 20 knots. This is due to the very large amount of wetted surface area of the twin submerged sidehulls. Further, since the SWATH's sidehulls are submerged its overall draft requirements are considered excessive for all but deep water ports and cruising areas.

The instant invention, in its preferred embodiment, offers three distinct modes of operation: 1) High speed as a minimum draft Surface Effect Ship wherein blower pressurized air cushions built into at least one of the multiple hulls support a majority of displacement, 2) Intermediate speed where the blower system is turned off and the hulls function primarily in a planing and/or displacement mode, and 3) Low speed maximum stability configuration wherein the sidehulls are at least semi-submerged, generally with the assistance of water ballast, such that there is a minimum strut waterplane area which results in minimum craft motions in a seaway.

The instant invention offers advancements over applicant's earlier inventions as well as over the prior art. These advancements are discussed in some detail in the following sections.

SUMMARY OF THE INVENTION

The object of the instant invention is to offer the advantages of the great high speed efficiencies of an air cushion supported vessel such as the Surface Effect Ship (SES) coupled with tremendous stability while at rest or at low speeds that is accomplished by having small water surface intersection(s) or, as they are most commonly known, small waterplane area(s).

A related object of the invention is that one or more secondary supporting hull(s) are used for supporting a main hull that are disposed below the main hull and connected to the main hull by struts.

It is a further related object of the invention that the struts will be, at least in part, airfoil shaped.

Yet another related object of the invention is that at least one of the connecting struts will include a gas passageway that serves to pass pressurized gas from a blower to a pressurized gas cushion disposed in a recess in a secondary supporting hull.

A further related optional object of the invention is that the gas pressurized blower be disposed distal from a secondary supporting hull that it is supplying pressurized gas to.

A directly related object of the invention is that the gas pressurizing blower can be, at least partially, disposed in the main hull.

A further object of the invention is that a gas cushion recess be built into the structure of a secondary hull.

Another object of the invention is that a bow of a secondary hull can have a pointed or fine entry shape for improved ride qualities in rough seas.

Yet another object of the invention is that sidekeels disposed either side of a gas cushion recess in a secondary hull diverge going aft from said secondary hull's bow.

It is still another object of the invention that, in order to provide best rough sea ride qualities, total secondary hull sidekeel divergence angle does not exceed 26 degrees.

A further object of the invention is that a secondary supporting hull's sidekeels diverge for at least one quarter of the waterline length of the secondary supporting hull going aft from said secondary supporting hull's bow and then become more parallel.

Yet another object of the invention is that a gas cushion recess shall include an aft seal to reduce gas leakage.

A directly related object of the invention is that a gas cushion aft seal shall be, as seen in a vertical transverse plane of the secondary supporting hull, angled over a majority of its width.

Another object of the invention is that separate gas cushions in separate secondary supporting hulls be connected by a duct.

A directly related object of the invention is that a duct connecting gas cushions in separate supporting hulls at least in part can pass through struts.

Yet another object of the invention is that a hydrofoil connect secondary supporting hulls.

It is a directly related object of the invention that the hydrofoil can add stability to the vessel.

It another related object of the invention that the hydrofoil can add to the weight carrying capabilities of the vessel.

A related object of the invention is that the hydrofoil can contain a duct that, at least in part, connects separate gas cushions in separate secondary supporting hulls.

DETAILED DESCRIPTION

Figure 1:
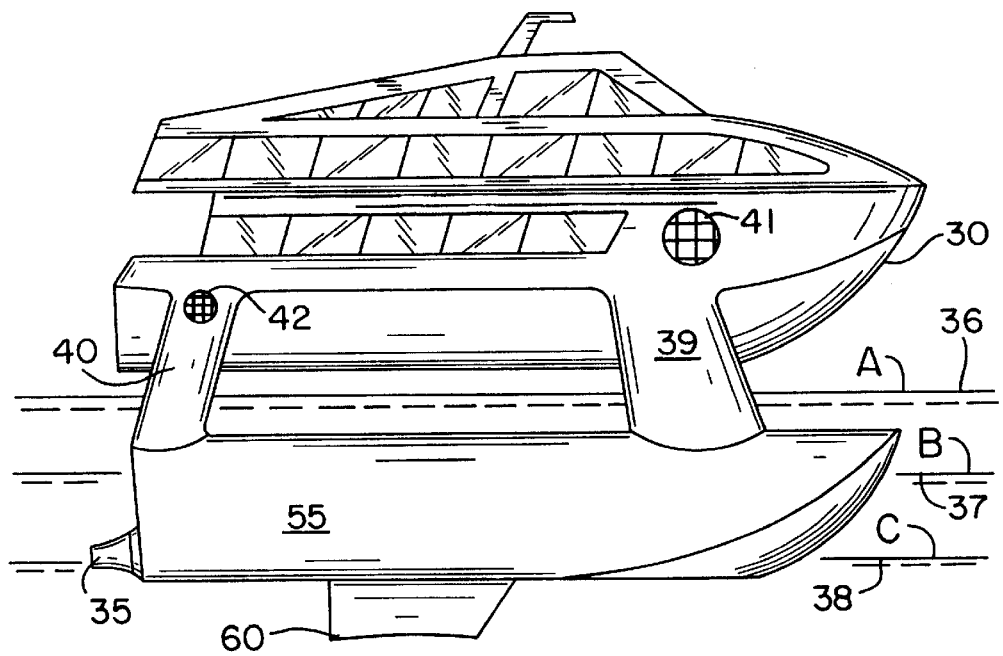
FIG. 1 presents an outboard profile view of the inventive boat hull which further shows low speed A waterline, medium speed B waterline, and high speed C waterline.

FIG. 1 shows an outside profile view of the inventive hull 30, a secondary supporting hull 55, forward strut 39, aft strut 40, hydrofoil 60, blower air inlet 41, engine room air inlet 42, and propulsor 35. It is important to note A waterline 36, B waterline 37, and C waterline 38 as they respectively show stopped or low speed, medium speed, and high speed operational waterlines.

Figure 2:
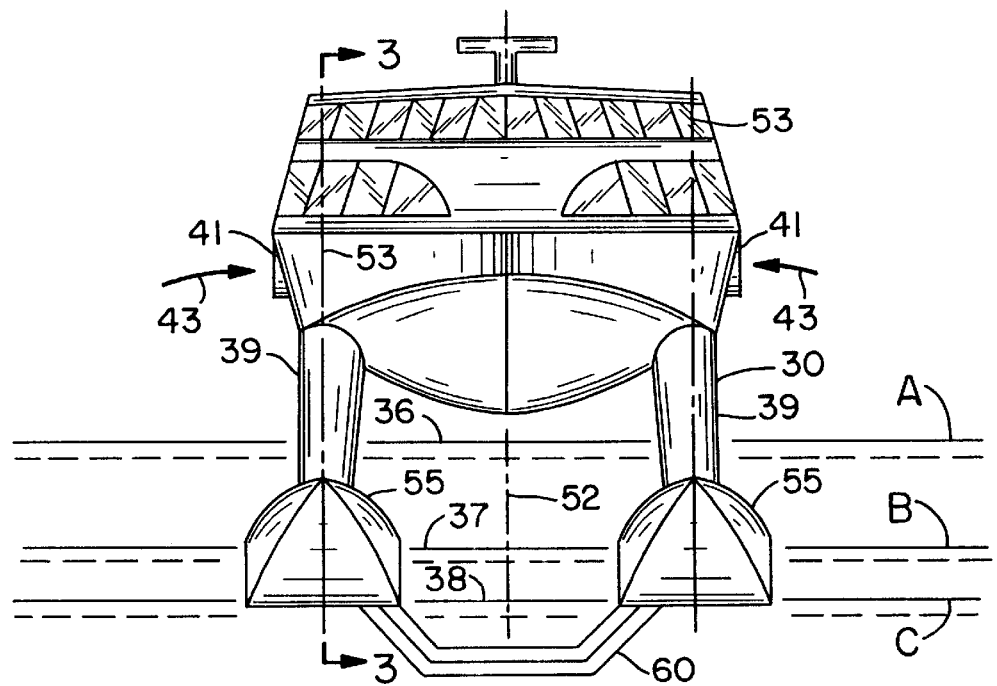
FIG. 2 is a bow view of the inventive boat hull shown in FIG. 1. This view also shows an optional hydrofoil that connects separate secondary supporting hulls.

FIG. 2 is a bow view of the same hull as presented in FIG. 1. Items shown in addition to those presented in FIG. 1 are the hull vertical centerline plane 52 and sidehull vertical centerline planes 53.

Figure 3:
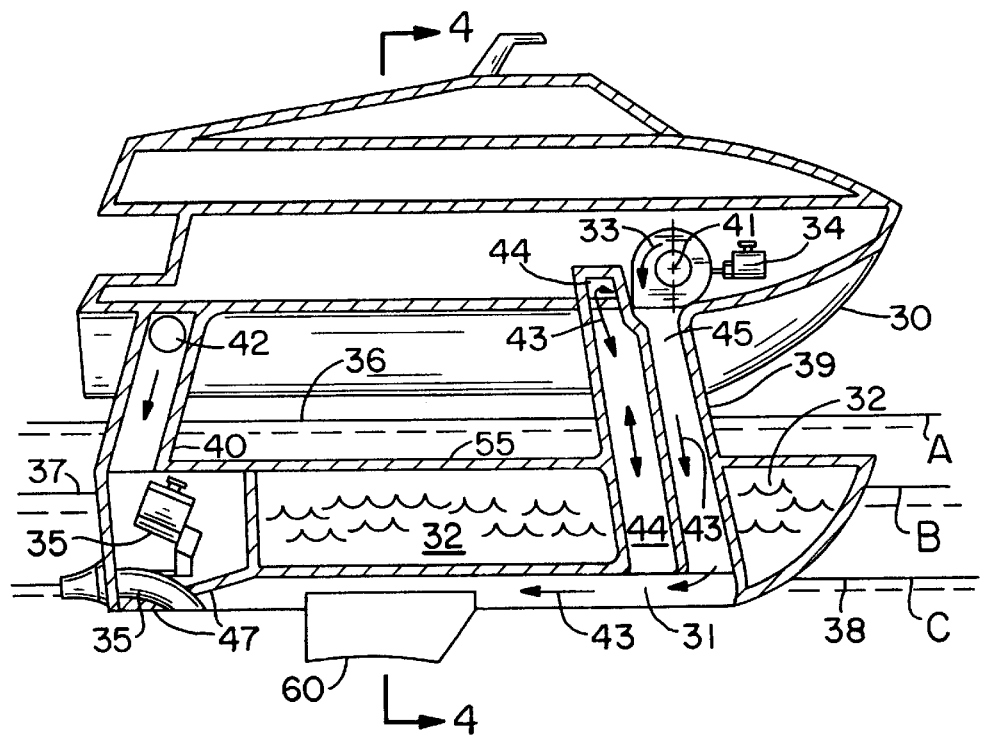
FIG. 3 is a cross sectional view, as taken through line 3—3 of FIG. 2, that shows a gas pressurizing blower system that supplies gas through a forward strut to a recess in a secondary supporting hull, a connecting duct, and vessel drive engine and propulsor.

FIG. 3 is a cross sectional view, as taken through line 3—3 of FIG. 2, that shows a gas pressurizing blower 33 and its drive engine 34, blower discharge duct 45, air flow arrows 43, gas cushion recess 31, recess sidekeel 4,6, recess aft seal 47, gas cross or interconnecting duct 44, and water buoyancy tanks 32. Note that the gas pressurizing blower 41 does not have to be located in the main hull but can be located in a strut or even in a secondary supporting hull; however, it is advisable although not absolutely essential to keep a blower above the A waterline to avoid corrosion of blower parts. Of course, in any case, air must be obtained from an opening above the A waterline to avoid solid water ingestion into a gas pressurizing blower when the blower is operating. It is important to note the high speed C waterline 38 in FIG. 3. When the inventive hull 30 is at the C waterline 38, the gas cushion recess 31 is pressurized with gas and at least mostly voided of water plus the water buoyancy tanks 32 are voided of water. For the medium speed condition the hull is at the B waterline 37, the buoyancy tanks 32 are voided of water, and the gas cushion recesses 31 are not pressurized with gas so they are, therefore, filled with water.

The A waterline 36 shown in FIG. 3 is the at rest or low speed condition where the supporting hulls 55 are at least partially submerged for maximum stability. It is also possible to design so that the buoyancy tanks 32 are not needed whereby there would be no B waterline 37 condition buy only the C waterline 38 and the A waterline 36 conditions.

Figure 4:
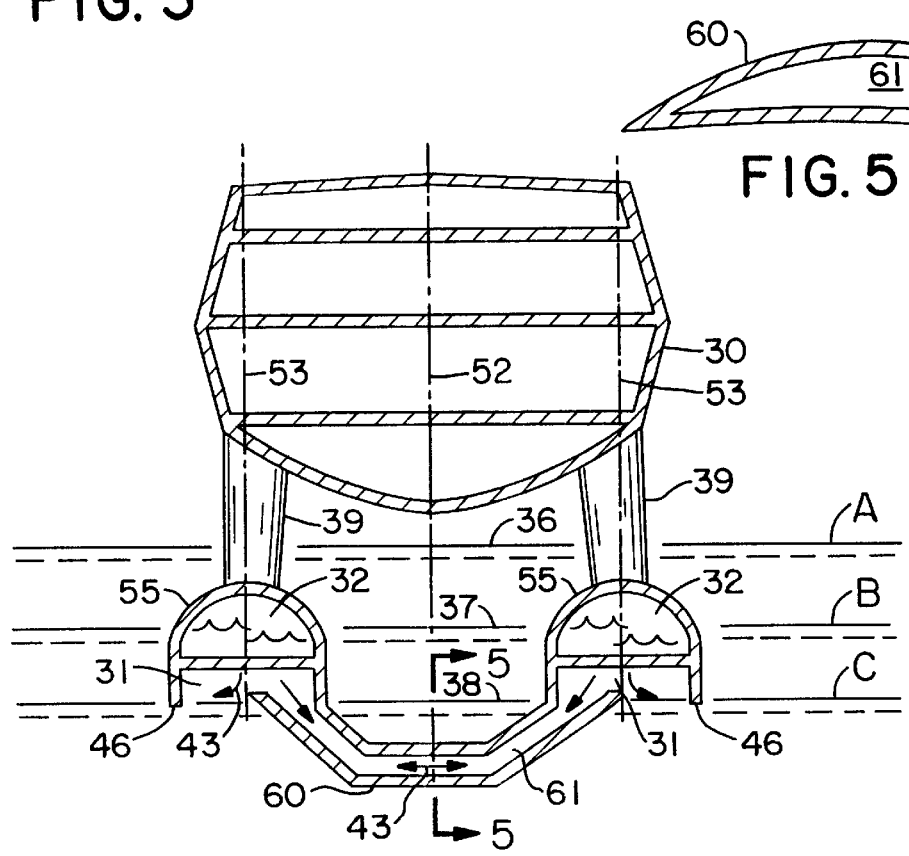
FIG. 4 presents a cross sectional view, as taken through line 4—4 of FIG. 3, that shows gas cushion recess and ballast tanks in secondary supporting hulls and an optional stabilizing hydrofoil that acts also to connect gas cushions in separate secondary supporting hulls.

FIG. 4 is a cross sectional view, as taken through line 4—4 of FIG. 3, that shows the same items as presented in FIG. 3 but in a vertical transverse plane of the hull 30. Note the hydrofoil 60 that extends between the secondary supporting hulls 55 that in this case includes a gas passageway or gas duct 61 that connects the gas cushion recesses 31 in the secondary supporting hulls 55.

Figure 5:
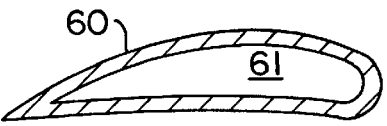
FIG. 5 is a cross sectional view, as taken through line 5—5 of FIG. 4, that shows a preferred airfoil shape of the hydrofoil that connects the secondary supporting hulls.

FIG. 5 presents a cross sectional view, as taken through line 5—5 of FIG. 4, that gives the preferred at least partial airfoil shape of a hydrofoil 60 that connects the secondary supporting hulls. The internal portion of this hydrofoil in its preferred embodiment includes a gas duct 61.

Figure 6:
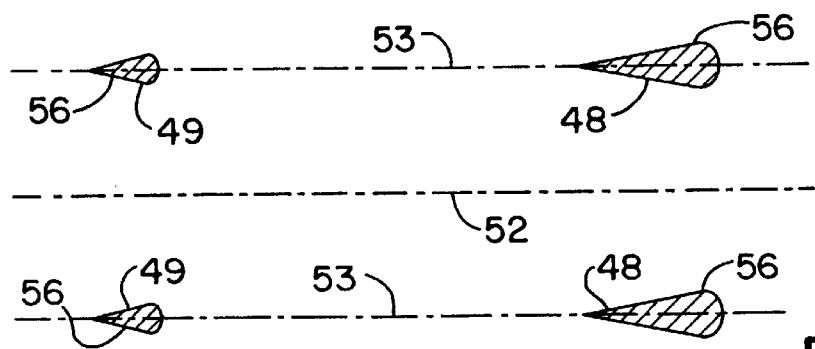
FIG. 6 shows the water intersection or waterplane areas of the struts where they intersect a calm sea surface waterline as at A waterline noted in FIGS. 1–4.

FIG. 6 shows the water intersection planes or waterplanes 56 as is preferred nomenclature for the condition A waterline of FIG's 1–4. Note that these waterplanes are made by the forward struts A waterline intersections 48, 49. These struts are, preferably, as least partially airfoil shaped to minimize resistance.

Figure 7:
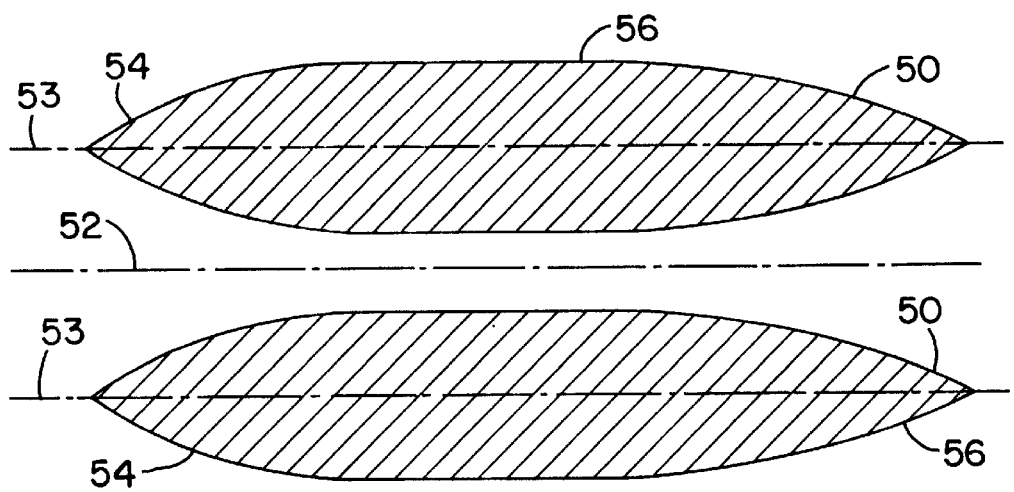
FIG. 7 depicts the water intersection or waterplane areas of the secondary supporting hull's at B waterline noted in FIGS. 1–4.

FIG. 7 presents the waterplanes 56 made by secondary supporting hulls B waterline intersections 50. Note the rear boatail sections 54 of these hulls that is done to minimize resistance when operating at medium speeds during the B waterline condition presented in FIGS. 1–4. Note also that all of the waterplanes presented are for a calm sea surface condition for simplicity. The B waterline condition is intended as an optional midspeed range condition with the blowers generally off.

Figure 8:
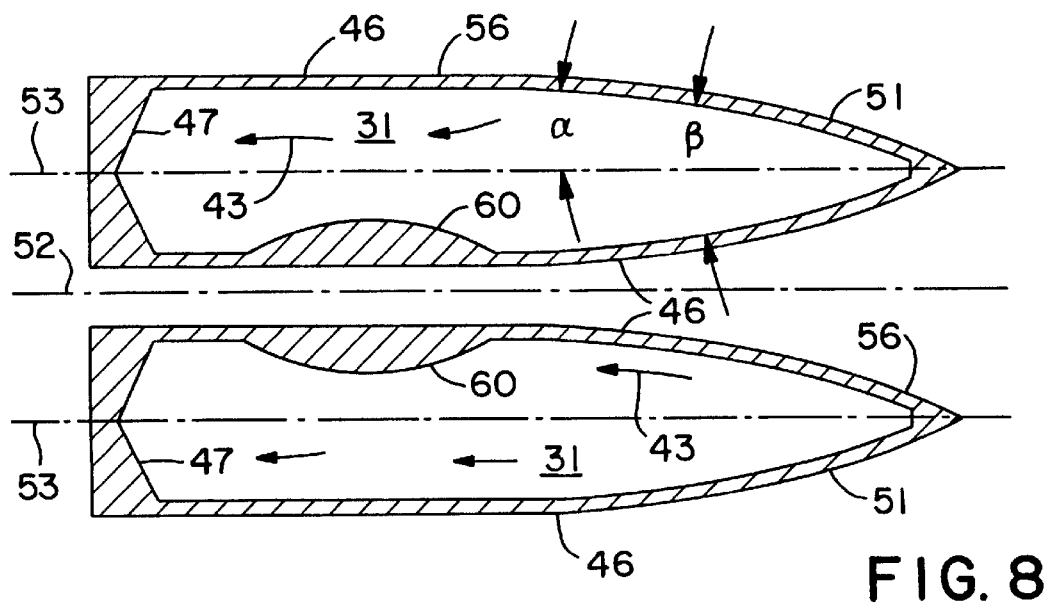
FIG. 8 indicates the reduced, compared to that shown in FIG. 7, waterplane area as is seen when the inventive boat is in its air cushion supported high speed operation mode.

FIG. 8 shows the waterplanes 56 made by the secondary supporting hulls C waterline intersections 51. The pressurized gas recess 31 normally supports about 85 percent of total displacement which results in a tremendous reduction in wetted area. That is the reason for the great efficiency in this condition at high speeds. The waterplane intersections of the optional hydrofoils 60 are shown here also.

Another item to be noted in FIG. 8 is the divergence angle B of the sidekeels 46 from each other going aft from their forward portions. Model tests have shown that limiting this divergence angle to less than 26 degrees gives best rough water ride characteristics with a sidekeel divergence angle of less than 20 degrees preferred. It is generally preferred that sidekeel divergence be equal on either side of the secondary supporting hull vertical centerline plane 53 as indicated by angle P. It is further to be noted that divergence of the sidekeels 46 takes place over at least 25 percent of the waterline length and that the sidekeels 46 then become more parallel.

The FIG. 6 condition has less waterplane area and hence by far the least movement in heavy seas but has a tremendous wetted area disposed below the waterline in the form of the secondary supporting hulls. The FIG. 7 condition actually has less wetted area underwater than the FIG. 6 condition but greatly more than the FIG. 8 high speed condition. For purposes of this application, high speed is intended to be speeds of over 22 knots and, while there can certainly be some overlap, medium or intermediate speeds as 12 to 22 knots, and low speed as less than 12 knots.

It should also be noted that any number from one, two, or more secondary hulls can be used in the instant invention; however, the catamaran hull arrangement presented in the figures herein are the preferred arrangement from a maximum stability combined with low manufacturing cost standpoint.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by the appended claims, which are the sole definition of the invention.

What I claim is:

1. In an improved marine vehicle, including a propulsor engine that is, at least in one of its modes of operation, partially supported by artificially pressurized gas cushions, the improvement comprising:

secondary supporting hulls in mechanical communication with a main hull by means of strut-like members wherein said strut-like members include gas passageways that connect a gas pressurization means with the pressurized gas cushions, said gas pressurization means including a powered blower where said powered blower receives at least a majority of its inlet air from sources other than exhaust from the propulsor engine the pressurized gas cushion disposed, at least in its majority, in gas cushion recesses built into undersides of the secondary supporting hulls, wherein when the gas cushion recesses are pressurized with gas and the improved marine vehicle is moving forward, the secondary supporting hulls are at high speed operational waterlines and when the gas cushion recesses are not pressurized with gas and the improved marine vehicle is at rest, said secondary supporting hulls are, at least in their majority, submerged and wherein, when the gas cushion recesses are pressurized with gas and the improved marine vehicle is moving forward, said gas cushions diverge over at least a portion of their length over their forward portions going from forward to aft.

2. The improved marine vehicle of claim 1 wherein when the gas cushions are not pressurized with gasp the strut-like members that include gas passageways that connect the gas pressurization means with the pressurized gas cushions are partially submerged so that said strut-like members intersect a calm sea surface waterline.

3. The improved marine vehicle of claim 1 which further comprises a gas passage duct that connects the gas cushion recess in one secondary supporting hull with the gas cushion recess in another secondary supporting hull.

4. The improved marine vehicle of claim 1 which further comprises a hydrofoil that connects one secondary supporting hull with another secondary supporting hull.

5. The improved marine vehicle of claim 4 which further comprises a gas passage duct in said hydrofoil wherein said gas passage duct at least in part connects the gas cushion recess in one secondary supporting hull with the gas cushion recess in another secondary supporting hull.

6. The improved marine vehicle of claim 1 wherein bows of the secondary supporting hulls have a pointed fine entry thereby providing good ride qualities in rough seas.

7. The improved marine vehicle of claim 1 which further comprises sidekeels disposed either side of said gas cushion recesses wherein said sidekeels diverge going aft from forward portions of the secondary supporting hulls and said sidekeels then become more parallel over their aft portions.

8. The improved marine vehicle of claim 7 wherein said sidekeels diverge going aft from a forward portion of their respective secondary supporting hulls at a maximum divergence angle of 26 degrees.

9. The improved marine vehicle of claim 7 wherein said sidekeels diverge going aft from a forward portion of their secondary supporting hulls by at least twenty five percent of a waterline length of said secondary supporting hulls.

10. The improved marine vehicle of claim 1 wherein the gas cushion recesses built into undersides of the secondary supporting hulls are at least partially bounded by gas cushion recess aft seals wherein said gas cushion recess aft seals, as viewed in a vertical transverse plane of the improved marine vehicle, are angled to horizontal over a majority of their width.

11. The improved marine vehicle of claim 1 which further comprises a water buoyancy tank disposed, at least in its majority, in one of the secondary supporting hulls whereby adding water to said water buoyancy tank aids in submerging the secondary supporting hull.

12. The improved marine vehicle of claim 11 wherein said improved marine vehicle can operate in several modes including high speed operational waterline when its gas cushion recesses are pressurized with gas and the improved marine vehicle is moving forward, medium speed operational waterline when its gas cushion recesses are not pressurized with gas and thereby are at least partially flooded with water, and a low speed operational waterline where, in addition to having its gas cushion recesses not pressurized with gas and thereby at least partially flooded with water, its ballast tanks are at least partially filled with water.

13. In an improved marine vehicle, including a propulsor engine, that is, at least in one of its modes of operation, partially supported by an artificially pressurized gas cushion, the improvement comprising:

a secondary supporting hull in mechanical communication with a main hull by means of a strut-like member wherein said strut-like member includes a gas passageway that connects a gas pressurization means with the pressurized gas cushion, said gas pressurization means including a powered blower where said powered blower receives at least a majority of its inlet air from sources other than exhaust from the propulsor engine, the pressurized gas cushion disposed, at least in its majority, in a gas cushion recess built into an underside of the secondary supporting hull wherein when the gas cushion recess is pressurized with gas and the improved marine vehicle is moving forward the secondary supporting hull is at a high speed operational waterline, wherein, when the gas cushion recess is pressurized with gas and the improved marine vehicle is moving forward, said gas cushion diverges over at least a portion of its length over its forward portion going from forward to aft, and when the gas cushion recess is not pressurized with gas and the improved marine vehicle is at rest, said secondary supporting hull is, at least in its majority, submerged.

14. The improved marine vehicle of claim 13 wherein when the gas cushion is not pressurized with gas, the strut-like member that includes a gas passageway that connects the gas pressurization means with the pressurized gas cushion is partially submerged so that said strut-like member intersects a calm sea surface waterline.

15. The improved marine vehicle of claim 13 which further comprises a water buoyancy tank disposed, at least in its majority, in the secondary supporting hull whereby adding water to said water buoyancy tank aids in submerging the secondary supporting hull.

16. The improved marine vehicle of claim 15 wherein said improved marine vehicle can operate in several modes including high speed operational waterline when its gas cushion recess is pressurized with gas and the improved marine vehicle is moving forward, medium speed operational waterline when its gas cushion recess is not pressurized with gas and thereby is at least partially flooded with water, and a low speed operational waterline where, in addition to having its gas cushion recess not pressurized with gas and thereby at least partially flooded with water, its ballast tank is at least partially filled with water.

17. The improved marine vehicle of claim 13 which further comprises an additional secondary supporting hull.

18. The improved marine vehicle of claim 13 which further comprises a sidekeel either side of the gas cushion recess wherein said sidekeels, after diverging from a forward portion of the secondary supporting hull, then become more parallel over their aft portions.

19. In an improved marine vehicle that is, in at least one of its modes of operation, partially supported by artificially pressurized gas cushions, the improvement comprising:

secondary supporting hulls in mechanical communication with a main hull by means of strut-like members, the pressurized gas cushions disposed, at least in their majority, in gas cushion recesses built into undersides of the secondary supporting hulls, wherein when the gas cushion recesses are pressurized with gas and the improved marine vehicle is moving forward the secondary supporting hulls are at a high speed operations waterline and when the recess gas cushions are not pressurized with gas and the improved marine vehicle is at rest, said secondary supporting hulls are, at least in their majority, submerged, and a hydrofoil that connects the secondary supporting hulls wherein said hydrofoil includes a gas passage duct that connects the gas cushion recess in one secondary supporting hull with the gas cushion recess in another secondary supporting hull.

20. The improved marine vehicle of claim 19 wherein, when the gas cushion recesses are pressurized with gas and the improved marine vehicle is moving forward, said gas cushions diverge over at least a portion of their length going from forward to aft.

* * * * *